(12) United States Patent
Witzmann et al.

(10) Patent No.: US 12,240,777 B2
(45) Date of Patent: Mar. 4, 2025

(54) GLASS TUBE

(71) Applicant: Schott AG, Mainz (DE)

(72) Inventors: André Witzmann, Waldershof (DE); Volker Trinks, Mitterteich (DE); Thomas Lenz, Mainz (DE)

(73) Assignee: Schott AG, Mainz (DE)

( * ) Notice: Subject to any disclaimer, the term of this patent is extended or adjusted under 35 U.S.C. 154(b) by 297 days.

(21) Appl. No.: 17/358,467

(22) Filed: Jun. 25, 2021

(65) Prior Publication Data
US 2021/0403362 A1 Dec. 30, 2021

(30) Foreign Application Priority Data
Jun. 26, 2020 (EP) ..................................... 20182696

(51) Int. Cl.
*C03B 17/04* (2006.01)
*A61J 1/05* (2006.01)
*C03B 33/06* (2006.01)
*C03C 3/093* (2006.01)

(52) U.S. Cl.
CPC ................. *C03B 17/04* (2013.01); *A61J 1/05* (2013.01); *C03B 33/06* (2013.01); *C03C 3/093* (2013.01)

(58) Field of Classification Search
CPC ......... C03C 3/093; C03C 3/083; C03C 3/085; C03C 3/087; C03C 3/091; A61J 1/06; A61M 5/3129
See application file for complete search history.

(56) References Cited

U.S. PATENT DOCUMENTS

| 4,388,094 | A | 6/1983 | Carpenter et al. |
| 10,000,300 | B2 | 6/2018 | Haeberlein |
| 2006/0130525 | A1 | 6/2006 | Buellesfeld et al. |
| 2016/0346165 | A1* | 12/2016 | Hoppe ..................... A61J 1/065 |
| 2017/0320766 | A1 | 11/2017 | De Angelis et al. |
| 2020/0391898 | A1* | 12/2020 | Antipin ..................... C03C 4/18 |
| 2023/0123424 | A1 | 4/2023 | Arai |

FOREIGN PATENT DOCUMENTS

| DE | 199 60 210 C1 | 7/2001 |
| DE | 10 2018 101 842 A1 | 8/2019 |
| EP | 3 345 876 A1 | 7/2018 |

(Continued)

OTHER PUBLICATIONS

English machine translation of JP 2017-78003 A issued Apr. 27, 2017 (16 pages).

(Continued)

*Primary Examiner* — Laura A Auer
(74) *Attorney, Agent, or Firm* — TAYLOR & EDELSTEIN

(57) ABSTRACT

At least one glass tube has an azimuthal wall thickness deviation WTD of not more than 6.0%, the azimuthal wall thickness deviation being determined based on a lowest wall thickness value and a highest wall thickness value measured within a cross-section of the at least one glass tube, the azimuthal wall thickness deviation WTD being calculated according to the following formula:

$$WTD = 100 - \left(\frac{\text{lowest wall thickness value}}{\text{highest wall thickness value}} * 100\right) \%.$$

19 Claims, 6 Drawing Sheets

(56) References Cited

FOREIGN PATENT DOCUMENTS

| | | |
|---|---|---|
| EP | 3 907 198 A1 | 11/2021 |
| JP | 8-283031 A | 10/1996 |
| JP | 2008-37713 A | 2/2008 |
| JP | 2009-234873 A | 10/2009 |
| JP | 2015-40139 A | 3/2015 |
| JP | 2017-78003 A | 4/2017 |

OTHER PUBLICATIONS

European Search Report dated Nov. 19, 2020 for European Patent Application No. 20182696.3 (4 pages).
European Office Action dated Jan. 14, 2021 for European Patent Application No. 20182696.3 (6 pages).
German Office Action dated Nov. 27, 2020 for German Application No. 20 173 251.8 (5 pages).
European Office Action dated Nov. 15, 2021 for European Patent Application No. 20173251.8 (2 pages).
Chinese Office Action dated Nov. 24, 2021 for Chinese Application No. 202120949610.0 (2 pages).
English translation of Chinese Office Action dated Nov. 24, 2021 for Chinese Application No. 202120949610.0 (2 pages).
English translation of Chinese Office Action dated May 24, 2023 for Chinese Application No. 202110718035.9 (9 pages).

\* cited by examiner

GLASS TUBE

CROSS REFERENCE TO RELATED APPLICATIONS

This application claims priority to European Patent Application No. EP 20182696.3 filed on Jun. 26, 2020, which is incorporated in its entirety herein by reference.

BACKGROUND OF THE INVENTION

1. Field of the Invention

The present invention relates to a glass tube, in particular a glass tube for the production of containers for storage of pharmaceutical compositions. The glass tube facilitates production of pharmaceutical containers with particularly high quality. Further, the present invention relates to a method for the production of a glass tube.

2. Description of the Related Art

For the production of glass tubes, in particular glass tubes for the production of pharmaceutical containers, such as ampoules, vials, cartridges or syringes, the so-called Danner process is often used. In the Danner process, a glass melt emerging out of a melting tank flows onto the outer surface of a rotating tubular body (a so-called Danner mandrel) to form thereon a hollow glass melt body. The glass melt is drawn from the mandrel, which serves as a shaping member, in a predetermined direction to a forward end. The inner profile of the glass tube is substantially determined by the outer contour near the front end of the mandrel.

Such glass tubes are semi-finished products for the production of said containers for storage of pharmaceutical compositions. As disclosed in German Patent Application DE 10 2018 101 842 A1, such glass tubes are typically converted to the containers via a hot forming process by using a glass processing device.

Although state of the art glass tubes often have quite acceptable uniformity in terms of inner and outer diameter, accuracy of hot forming processes still needs improvement. Particularly, hot forming processes for making pharmaceutical containers from glass tubes tend to be difficult to run stably, because a vast number of parameters needs to be optimized in order to account for variations in quality of the hot-formed product.

SUMMARY OF THE INVENTION

In some exemplary embodiments provided according to the present invention, at least one glass tube has an azimuthal wall thickness deviation WTD of not more than 6.0%, the azimuthal wall thickness deviation being determined based on a lowest wall thickness value and a highest wall thickness value measured within a cross-section of the at least one glass tube, the azimuthal wall thickness deviation WTD being calculated according to the following formula:

$$WTD = 100 - \left(\frac{\text{lowest wall thickness value}}{\text{highest wall thickness value}} * 100\right) \%.$$

In some exemplary embodiments provided according to the present invention, a process for producing a glass tube includes: applying a glass melt onto an outer surface of a rotating conical mandrel by guiding the glass melt from a feed tank through an outlet, the glass melt forming a strand of molten glass that flows from the outlet onto the outer surface of the conical mandrel; forming a hollow glass melt body on the conical mandrel; drawing the hollow glass melt body from the conical mandrel in a predetermined direction toward a front end for forming a glass tube, the outer surface having a wetting zone where the strand of molten glass first contacts the conical mandrel, the wetting zone is at a vertical distance from the outlet and a vertical movement of the conical mandrel is monitored; reducing vertical movement of the conical mandrel; cooling the hollow glass melt body; and cutting the cooled glass melt body into glass tubes.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
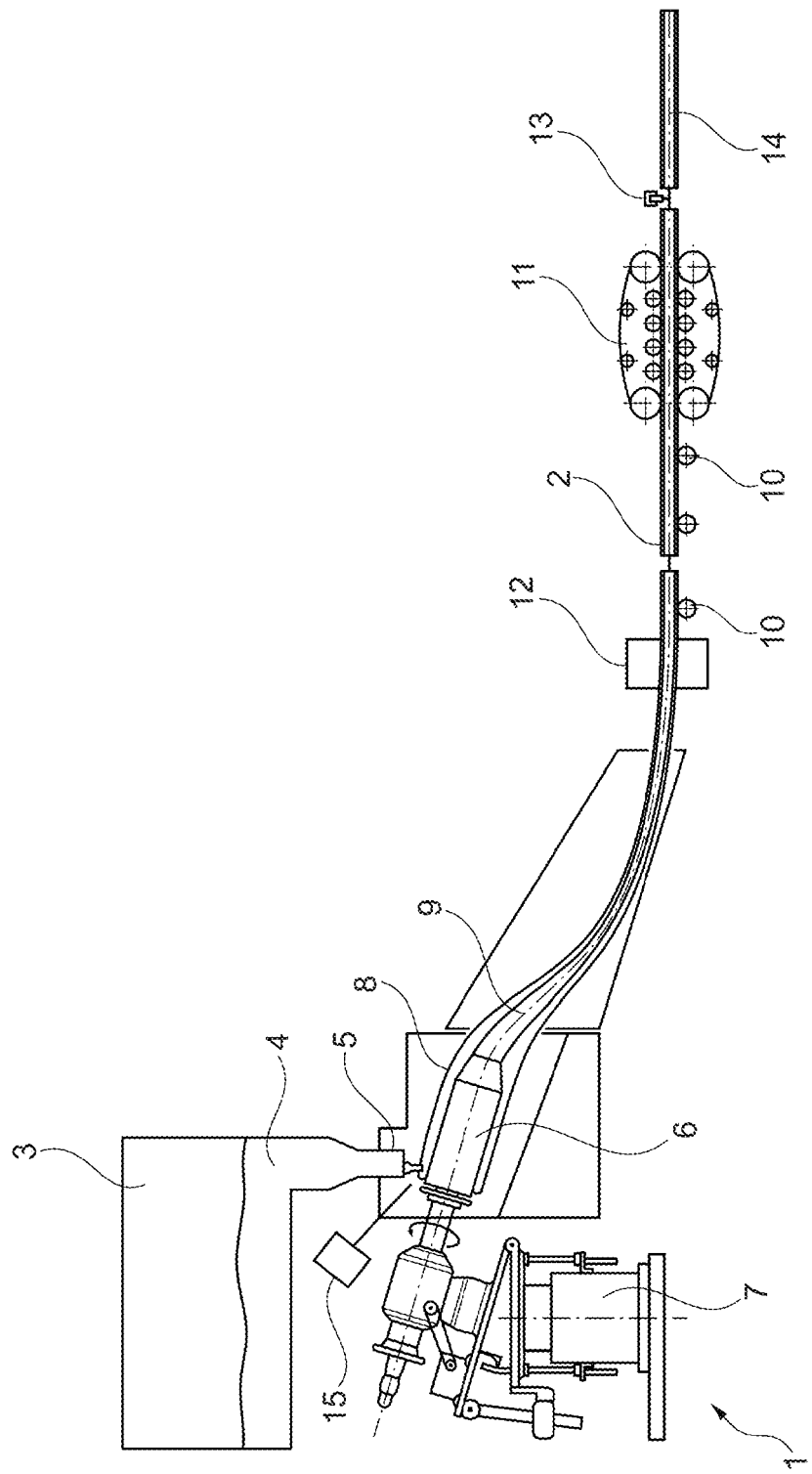
FIG. 1 illustrates, in a schematic sectional view, a manufacturing apparatus for a method provided according to an exemplary embodiment of the present invention.

Exemplary embodiments provided according to the present invention provide an improved glass tube, especially to provide a glass tube that provides for improved accuracy and/or simplified optimization of parameters in a hot forming process.

In some embodiments, the invention relates to at least one glass tube having an azimuthal wall thickness deviation of not more than 6.0%. The azimuthal wall thickness deviation is determined based on the lowest and the highest wall thickness values measured within a cross-section of the glass tube. The azimuthal wall thickness deviation WTD is calculated according to the following formula:

$$WTD = 100 - \left(\frac{\text{lowest wall thickness value}}{\text{highest wall thickness value}} * 100\right) \%.$$

A glass tube having the indicated azimuthal wall thickness deviation performs excellently during hot forming. The glass tube has at least one cross-section with the indicated azimuthal wall thickness deviation. In some embodiments, the glass tube has the indicated WTD limit value at any of the analyzed cross-sections, such as over the whole length of the tube. Optionally, the indicated azimuthal wall thickness deviation is present in at least two cross-sections that are spaced apart from each other along the length of the glass tube. Optionally, two or more cross-sections of the glass tube do not exceed the indicated WTD, wherein optionally at least two of the cross-sections are spaced apart from each other by at least 0.5 m, such as by at least 0.75 m, by at least 1.0 m, and/or by at most 1.4 m. In some embodiments, the tube does not exceed the indicated WTD at least at a first and a second cross-section, wherein the first cross-section is positioned in a first section of the glass tube and the second cross-section is positioned in a second or third section of the glass tube. In some embodiments, the azimuthal wall thickness deviation either at a single cross-section, at two or more cross-sections or at essentially all cross-sections (such as at least 75%, at least 90% or at least 95% of the tube's length) may be at most 5.0%, at most 4.0% at most 3.0%, at most 2.5% and optionally at most 2.0%. In some embodiments, the azimuthal wall thickness deviation either at a single cross-section, at two or more cross-sections or at essentially all cross-sections (such as at least 75%, at least 90% or at least 95% of the tube's length) may be at least 0.1% or at least 0.5%.

Surprisingly, it was found that the azimuthal wall thickness deviation of glass tubes can vary significantly from glass tube to glass tube and along the longitudinal direction of a glass tube. These variations of wall thickness impede production accuracy of pharmaceutical containers that are made from these glass tubes. It is particularly difficult to optimize the parameters of a hot forming process in order to account for azimuthal wall thickness deviations. A glass tube is a semi-finished product that can be used for production of syringes, vials, ampoules, cartridges, or other pharmaceutical containers. These containers are typically produced in hot forming processes. Hot forming includes heating the glass tube to a temperature where the glass can be formed to the desired shape. Depending on the mass of glass to be heated to the desired temperature, different amounts of heat will be needed. Adjusting the amount of heat used during hot forming is difficult as these processes produce pharmaceutical containers at very high rates. Because of these high production rates, controlling the heat depending on glass tube properties is hardly possible. In fact, while it is already difficult to account for certain glass mass deviations along the length of a tube, it is far more cumbersome, if not impossible, to take azimuthal variations into account because they occur at the same cross-section of the tube and the tube spins around its longitudinal axis during hot forming. It was found that controlling azimuthal glass mass distribution is essential so that the amount of heat used in the production of pharmaceutical containers can remain constant.

Using the appropriate amount of heat during hot forming of glass is essential because viscosity of glasses varies dramatically with temperature. Between room temperature and the temperature in the melting vessel, glass viscosity may change by a factor of $10^{17}$. Thus, a small temperature deviation may have a strong impact on glass viscosity. A different viscosity has a strong impact on hot forming of containers. The hot forming parameters have to account for this behavior. Typically, the Vogel-Fulcher-Tammann (VFT) equation is used to calculate the temperature needed to achieve a certain viscosity of a glass (see DIN ISO 7884-2:1998-2):

$$lg\eta = A + \frac{B}{T - T_0}$$

In the VFT equation, $\eta$ is the viscosity, A and B are temperature independent parameters of the material, T is the temperature and $T_0$ is the Vogel temperature. A, B and $T_0$ are constant for any specific glass.

It is evident that temperature has a strong influence on viscosity and that the temperature dependence can be described with the constants in the VFT equation. If the temperature is too low, the glass will have a high viscosity, making it difficult to form an accurate pharmaceutical container. If the temperature is too high, viscosity may be too low so that sagging may occur, yielding distorted containers. Specifications have focused on tolerances of outer diameters of glass tubes, neglecting azimuthal deviations of the wall thickness. It was found that glass tubes with lower azimuthal wall thickness deviations have uniform circumferential glass mass distributions. These tubes perform very well in subsequent manufacturing processes of pharmaceutical containers such as syringes, vials, ampoules and cartridges.

In some embodiments, the glass of the glass tube may have a value B of at least 4000, at least 4500 or at least 5000. Optionally, the B value may be up to 12000, up to 10000 or up to 9000. $T_0$ may be at least 1° C., at least 10° C., at least 70° C. or at least 200° C. In some embodiments, $T_0$ ranges up to 250° C., or up to 230° C. A may be less than 0, such as less than −0.5 or less than −1.0. In some embodiments, A is at least −5.0, at least −4.0 or at least −3.5. In some embodiments, A may reach from −5.0 to 0.0 or from −4.0 to 0.0. Glass tubes having the low azimuthal wall thickness deviations described herein and these VFT constants perform excellently in container hot forming.

Optionally, the glass may have the following VFT constants: A ranging from −5.0 to 0.0; B ranging from 4000 to 12000' and/or $T_0$ ranging from 1° C. to 250° C. In some embodiments, A ranges from −3.0 to −1.0; B ranges from 4000 to 9000 and/or $T_0$ ranges from 200° C. to 250° C. For the glass of the glass tube, $T_g$ may be in the range of from 525° C. to 600° C.

It is hypothesized that azimuthal wall thickness deviations result from irregularities of the glass feed mechanism used in glass tube production. In particular, variations of a vertical position of the location where the glass melt first touches the outer surface of the mandrel (wetting zone) have an influence on azimuthal wall thickness deviations. The mandrel is a very heavy component that rotates about a rotation axis. The rotation is not perfect but has slight deviations in both a horizontal and vertical direction. The deviations are very small, e.g. a few millimeters or tenths of millimeters, but sufficient to cause considerable azimuthal wall thickness deviations in the glass tube. It was found that vertical deviations have a particularly strong impact on WTD. In this disclosure, "vertical" refers to the direction of the gravitational force, i.e. the initial flow direction of the glass melt, when it leaves the outlet of the feed tank. With respect to the position of the wetting zone or the mandrel, "horizontal" refers to the direction perpendicular to the vertical direction and perpendicular to the tube drawing direction.

A glass tube having the azimuthal wall thickness deviation provided according to the invention not only has highly uniform wall thickness but also a circumferentially uniform glass mass distribution. Introducing and monitoring an azimuthal wall thickness deviation parameter as described according to the present invention allows for an optimal, such as minimal, adjustment of the processing parameters in a subsequent hot forming process for making pharmaceutical containers from said glass tube which will ultimately result in improved pharmaceutical containers and process stability.

The term "glass tube" as used herein refers to a hollow glass body for the production of containers for storage of substances for pharmaceutical applications, such as ampoules, vials, syringes and/or cartridges. The glass tube typically has a wall surrounding a lumen and two open ends.

The glass may be a silicate glass, such as a borosilicate glass. The glass tube may consist of a glass comprising the following oxides, in percent (%) by weight, based on the total amount of glass:

| | |
|---|---|
| $SiO_2$ | 50-90 |
| $B_2O_3$ | 0-20 |
| $Al_2O_3$ | >0-18 |
| $Na_2O$ | 0-15 |
| $K_2O$ | 0-5 |
| $Li_2O$ | 0-2 |
| CaO | 0-15 |
| BaO | 0-6 |
| $ZrO_2$ | 0-5 |
| $TiO_2$ | 0-5 |
| $Fe_2O_3$ | 0-3 |

The choice of glass components influences the temperature dependence of glass viscosity. For example, addition of certain amounts of $SiO_2$ will decrease the value for A, and increase the B value and $T_0$ in the VFT equation. The following table summarizes the influence of glass components on the VFT constants, wherein "+" refers to an increasing effect, "++" means that the respective constant is increased strongly, "–" refers to a decreasing effect, "– –" means that the respective constant is strongly decreased by an increased amount of the respective glass component.

| | A | B | $T_0$ |
|---|---|---|---|
| $Na_2O$ | ++ | – – | – |
| $K_2O$ | – | – | – – |
| CaO | – – | – | ++ |
| MgO | – – | ++ | – – |
| $Al_2O_3$ | ++ | + | ++ |
| $SiO_2$ | – – | ++ | ++ |

The glass may comprise $SiO_2$ in a proportion of at least 50% by weight, such as at least 55% by weight, at least 60% by weight, or at least 65% by weight based on the total amount of glass. $SiO_2$ is an important network former in the glass matrix which influences the glass properties. In particular, $SiO_2$ is especially important for the chemical resistance of the glass. The content of $SiO_2$ in the glass may be at most 90% by weight, such as at most 85% by weight or at most 80% by weight based on the total amount of glass. Too high contents of $SiO_2$ may result in a strong increase of the softening point of the glass.

Besides $SiO_2$ the glass may also comprise at least one second network former. The glass may contain $B_2O_3$ as an additional network former which is contained in a proportion of at least 3% by weight, such as at least 4% by weight or at least 6% by weight, based on the total amount of glass. Through its network forming properties $B_2O_3$ essentially supports the stability of the glass. In the case of too low contents of $B_2O_3$ the required stability in the glass system cannot be guaranteed. Nevertheless, the content of $B_2O_3$ in the glass is at most 20% by weight, such as at most 15% by weight or at most 12% by weight, based on the total amount of glass. In the case of too high contents of $B_2O_3$ in the glass the viscosity may be reduced strongly so that a reduction of the crystallization stability has to be accepted.

Further, the glass may comprise aluminum oxide. The addition of aluminum oxide serves to improve glass forming and generally supports chemical resistance. The proportion of aluminum oxide in the glass may be at most 12% by weight, such as at most 9% by weight or at most 7% by weight, based on the total amount of glass. In some embodiments, the amount of $Al_2O_3$ is less than 6.5% by weight. However, too high contents of aluminum oxide result in an increased tendency to crystallization. In some embodiments, the amount of aluminum oxide in the glass is at least 1% by weight, such as at least 2.5% by weight or at least 4% by weight, based on the total amount of glass.

The glass may comprise alkali metal oxides in a proportion of at least 3% by weight, such as at least 5% by weight or at least 6% by weight, based on the total amount of glass. $Na_2O$ and $K_2O$ may both be contained in the glass.

Alkali metal oxides improve the meltability of the glass and thus allow an economic production. During the production of the glass they serve as fluxing agents. The sum of the alkali metal oxides in the glass should not exceed the value of 20% by weight, such as 13% by weight or 10% by weight. Optionally, the amount of alkali metal oxides is less than 8.0% by weight. If the contents of alkali metal oxides are too high, the weathering resistance of the glass may be compromised and thus the range of applications thereof may strongly be limited.

Optionally, a ratio $RO/R_2O$ of the total weight amount of alkaline earth metal oxides (e.g. CaO, BaO, SrO and MgO) relative to the total weight amount of alkali metal oxides (e.g. $Na_2O$, $K_2O$, $Li_2O$) is at least 0.10, at least 0.15 or at least 0.20. A minimum value for this ratio helps achieve a good hydrolytic resistance without compromising the viscosity profile of the glass.

The proportion of $Na_2O$ in the glass may be at least 3% by weight, such as at least 5% by weight or at least 6% by weight, based on the total amount of glass. However, the proportion of $Na_2O$ in the glass may be limited to at most 15% by weight, such as at most 10% by weight, or at most 8% by weight, based on the total amount of glass.

The proportion of $K_2O$ in the glass may be at most 5% by weight, such as at most 3% by weight each or at most 2% by weight or at most 1.5% by weight, based on the total amount of glass.

The glass may also contain additives besides the above-mentioned components. These additives may, for example, be alkaline earth metal oxides (e.g. BaO, CaO) which may be added to the glass to manipulate the flowing and melting properties or the chemical resistance of the glass. In addition or alternatively, the glass may contain oxides of d group metals, such as iron oxides (FeO, $Fe_2O_3$, or $Fe_3O_4$). Iron oxides are common impurities of the main components of the glass, in particular impurities of the sand.

The proportion of BaO in the glass may be at most 6% by weight, such as at most 4% by weight each or 3% by weight, based on the total amount of glass.

The proportion of CaO in the glass may be at most 5% by weight, such as at most 3% by weight each or at most 2% by weight, based on the total amount of glass. Optionally, the amount of CaO may be at least 0.5% by weight or at least 1.0% by weight.

The proportions of $Fe_2O_3$ in the glass may be at most 3% by weight, such as at most 2% by weight each, such as 1.5% by weight, based on the total amount of glass.

The glass compositions may also comprise titanium dioxide. The content of $TiO_2$ in the glass is at most 10% by weight, such as at most 8% by weight or at most 6% by weight, based on the total amount of glass. Very high contents of $TiO_2$ may result in undesirable crystallization of the glass.

In some embodiments, the glass may comprise in weight percentages:

| | |
|---|---|
| $SiO_2$ | 65-83 |
| $B_2O_3$ | 0-15 |
| $Al_2O_3$ | 1-13 |
| $Na_2O$ | 3-13 |
| $K_2O$ | 0-3 |
| $Li_2O$ | 0-0.1 |
| CaO | 0-8 |
| BaO | 0-4.5 |
| $ZrO_2$ | 0-0.1 |
| $TiO_2$ | 0-1 |
| $Fe_2O_3$ | 0-3 |

The azimuthal wall thickness deviation is calculated using the lowest and the highest wall thickness values measured at a single cross-section of the glass tube. A "cross-section" is a sectional plane perpendicular to the tube's longitudinal axis. The azimuthal wall thickness deviation is calculated according to the following formula:

$$WTD = 100 - \left(\frac{\text{lowest wall thickness value}}{\text{highest wall thickness value}} * 100\right)$$

The term "wall thickness" as used herein describes the shortest distance between the inner and outer diameter of the glass tube at a given position.

The azimuthal wall thickness deviation (WTD) compares the lowest and the highest wall thickness values within a given cross-section. Thus, a glass tube that has an azimuthal wall thickness deviation of at most 6.0% has a very uniform wall thickness distribution in a cross-section along its length. In some embodiments, the indicated limit of azimuthal wall thickness deviation applies to essentially every cross-section of a glass tube. However, it was found that it is sufficient to measure azimuthal wall thickness deviations at a couple of representative cross-sections, such as one cross-section close to one end and another cross-section close to the other end. In some embodiments, the azimuthal wall thickness deviation of the glass tube applies to two or more cross-sections that are spaced apart from each other along the length of the glass tube.

In some embodiments, the glass tube has an azimuthal wall thickness deviation of at most 6.0%, at most 5.0%, at most 4.0%, at most 3.0%, at most 2.8%, at most 2.6%, at most 2.4%, at most 2.2%, or at most 1.5%. In some embodiments, the WTD is at least 0.1% or at least 0.5%.

In some embodiments, the at least two cross-sections, i.e. the sectional planes at which the azimuthal wall thickness deviation is determined, are spaced apart from each other by at least 0.5 m, such as by at least 0.75 m, by at least 1 m, and, in some embodiments, by at most 1.4 m.

At least one of the cross-sections may be positioned in a first section of the glass tube and a second cross-section may be positioned in a second or third section of the glass tube. The first section may range from the first end of the glass tube in a longitudinal direction towards the second end thereof and it may have a length of one third of the tube's length. The third section may range from the second end of the glass tube in a longitudinal direction towards the first end thereof and it may have a length of one third of the tube's length. The second section may be positioned between the first and third sections and having a length of one third of the tube's length in a longitudinal direction.

In some embodiments, the glass tube has a maximal azimuthal wall thickness deviation. A maximum azimuthal wall thickness deviation of the glass tube is the highest azimuthal wall thickness deviation measured in one glass tube. The maximum azimuthal wall thickness deviation can be determined based on two azimuthal wall thickness deviation values that may be determined for instance in the first and third sections of the glass tube, or first and second sections, or second and third sections of the glass tube. In some embodiments, one azimuthal wall thickness deviation value is determined in each of the three sections. The maximum azimuthal wall thickness deviation of the glass tube may also be based on more than two or three azimuthal wall thickness deviation values, i.e. on four, on five, on six, on seven, on eight, on nine, on ten or more azimuthal wall thickness deviation values. Each azimuthal wall thickness deviation value may be determined at a specific cross-section of the tube. If the azimuthal wall thickness deviation values are determined at more than two cross-sections, the distances between each cross-section and its neighboring cross-section(s) may be essentially equal or different.

The maximum azimuthal wall thickness deviation may be at most 6.0%, at most 5.0%, at most 4.0%, at most 3.0%, at most 2.8%, at most 2.6%, at most 2.4%, at most 2.2%, or at most 1.5%. In some embodiments, the maximum WTD is at least 0.1% or at least 0.5%.

In some embodiments, the glass tube has an average azimuthal wall thickness deviation of at most 6.0%, at most 5.0%, at most 4.0%, at most 3.0%, at most 2.8%, at most 2.6%, at most 2.4%, at most 2.2%, or at most 1.5%. In some embodiments, the average WTD is at least 0.1% or at least 0.5%. The average azimuthal wall thickness deviation may be determined at two or more, three or more, four or more, or five or more cross-sections of the glass tube. In some embodiments, the average azimuthal wall thickness deviation is the arithmetic mean of the measured wall thickness deviation values. For example, three azimuthal wall thickness deviation values may, for instance, be determined at cross-sections in the first, second and last sections along the length of the glass tube, resulting in three separate azimuthal wall thickness deviation values. To determine the average azimuthal wall thickness deviation of said glass tube, an arithmetical average is calculated by dividing the sum of the individual WTD values by the number of measured cross-sections.

The glass tube provided according to the present disclosure may have a length of at least 0.50 m, such as a length of at least 1.00 m or a length of at least 1.25 m. The length of the glass tube may be up to 3.00 m, up to 2.00 m or up to 1.70 m. This invention provides for a glass tube with the desired azimuthal wall thickness deviation even at a length of more than 1.00 m. In some embodiments, the length of the glass tube is about 1.5 m.

The term "outer diameter" as used herein refers to the maximum distance between two points on the outer surface of the glass tube, wherein the two points are connected by a straight line, which is perpendicular to and intersects with the longitudinal axis of the glass tube.

The term "inner diameter" as used herein refers to the maximum distance between two points on the inner surface of the glass tube, wherein the two points are connected by a straight line, which is perpendicular to and intersects with the longitudinal axis of the glass tube.

In some embodiments of the disclosure, the glass tube has an outer diameter of at least 6.0 mm or at least 10.0 mm. The outer diameter may be up to 55.0 mm, up to 40.0 mm or up to 25.0 mm. In some embodiments, the outer diameter may be chosen between 6 mm and 55 mm, or from 6 mm to 25 mm. The wall thickness may vary between 0.3 mm and 3.5 mm. In some embodiments, the wall thickness is at least 0.5 mm, at least 0.7 mm or at least 1.0 mm. Optionally, the wall thickness may be up to 3.5 mm, up to 3.0 mm or up to 2.0 mm. The single values of the outer diameter and the wall thickness strongly depend on the intended use of the glass tube.

A glass tube for pharmaceutical containers, particularly tubes for syringes may provide an outer diameter between 6.0 mm and 23.0 mm and/or a wall thickness between 0.75 mm and 2.5 mm. An exemplary embodiment comprises an outer diameter between 6.7 mm and 7.0 mm and a wall thickness between 1.0 mm and 1.2 mm. A further exemplary embodiment comprises an outer diameter between 8.00 mm and 8.30 mm and a wall thickness between 0.8 mm and 1.0 mm. A further exemplary embodiment comprises an outer diameter between 10.0 mm and 11.5 mm and a wall thickness between 1.0 mm and 1.2 mm. A further exemplary embodiment comprises an outer diameter between 14.0 mm and 15.0 mm and a wall thickness between 1.2 mm and 1.4 mm. A further exemplary embodiment comprises an outer diameter between 16.5 mm and 17.5 mm and a wall thickness between 1.3 mm and 1.5 mm. A further exemplary embodiment comprises an outer diameter between 21.0 mm and 23.0 mm and a wall thickness between 1.4 mm and 1.6 mm.

A glass tube for pharmaceutical containers, particularly a tube for cartridges may provide an outer diameter between 8.0 mm and 19.0 mm and a wall thickness between 0.75 mm and 1.4 mm. An exemplary embodiment comprises an outer diameter between 8.5 mm and 8.8 mm and a wall thickness between 0.8 mm and 1.0 mm. A further exemplary embodiment comprises an outer diameter between 10.5 mm and 11.5 mm and a wall thickness between 1.0 mm and 1.2 mm. A further exemplary embodiment comprises an outer diameter between 10.5 mm and 11.5 mm and a wall thickness between 0.75 mm and 0.95 mm. A further exemplary embodiment comprises an outer diameter between 11.0 mm and 12.0 mm and a wall thickness between 0.9 mm and 1.1 mm. A further exemplary embodiment comprises an outer diameter between 13.5 mm and 14.5 mm and a wall thickness between 0.9 mm and 1.2 mm. A further exemplary embodiment comprises an outer diameter between 14.0 mm and 15.0 mm and a wall thickness between 1.2 mm and 1.4 mm. A further exemplary embodiment comprises an outer diameter between 18.0 mm and 18.5 mm and a wall thickness between 1.0 mm and 1.2 mm.

A glass tube for pharmaceutical containers, particularly a tube for vials may have an outer diameter between 6.0 mm and 55.0 mm and a wall thickness between 0.5 mm and 2.5 mm. An exemplary embodiment comprises an outer diameter between 6.5 mm and 9 mm and a wall thickness between 0.5 mm and 1.6 mm. A further exemplary embodiment comprises an outer diameter between 8.5 mm and 16.0 mm and a wall thickness between 0.5 mm and 1.7 mm. A further exemplary embodiment comprises an outer diameter between 14.5 mm and 18.5 mm and a wall thickness between 0.6 mm and 1.7 mm. A further exemplary embodiment comprises an outer diameter between 17.5 mm and 20.5 mm and a wall thickness between 0.6 mm and 1.7 mm. A further exemplary embodiment comprises an outer diameter between 19.5 mm and 25.5 mm and a wall thickness between 0.6 mm and 1.7 mm. A further exemplary embodiment comprises an outer diameter between 22.5 mm and 35.0 mm and a wall thickness between 0.5 mm and 1.8 mm. A further exemplary embodiment comprises an outer diameter between 29.0 mm and 37.0 mm and a wall thickness between 0.9 mm and 1.7 mm. A further exemplary embodiment comprises an outer diameter between 32.5 mm and 45.0 mm and a wall thickness between 1.2 mm and 1.8 mm. A further exemplary embodiment comprises an outer diameter between 40.0 mm and 55.0 mm and a wall thickness between 1.5 mm and 2.2 mm.

A glass tube for pharmaceutical containers, particularly a tube for ampoules may provide an outer diameter between 8.0 mm and 30.0 mm and a wall thickness between 0.2 mm and 1.0 mm. An exemplary embodiment comprises an outer diameter between 8.5 mm and 16.0 mm and a wall thickness between 0.3 mm and 0.8 mm. A further exemplary embodiment comprises an outer diameter between 14.5 mm and 18.5 mm and a wall thickness between 0.35 mm and 0.85 mm. A further exemplary embodiment comprises an outer diameter between 17.5 mm and 20.5 mm and a wall thickness between 0.45 mm and 0.85 mm. A further exemplary embodiment comprises an outer diameter between 19.0 mm and 26.0 mm and a wall thickness between 0.55 mm and 0.9 mm.

The glass tube provided according to the invention has an inner diameter. The inner diameter may be at least 3.0 mm, at least 4.0 mm or at least 8.0 mm. In some embodiments, the inner diameter may be up to 50.0 mm, up to 40.0 mm, up to 30.0 mm or up to 20.0 mm.

In some embodiments, the glass tube provided according to the present disclosure has an average linear coefficient of thermal expansion measured in the range of 20° C. to 300° C. (CTE) between 3.0 and $8.0*10^{-6}K^{-1}$, or between 3.5 and $7.0*10^{-6}K^{-1}$, or between 4.0 and $6.0*10^{-6}K^{-1}$. Optionally the CTE may be less than $5.2*10^{-6}K^{-1}$ or less than $5.1*10^{-6}K^{-1}$. It is beneficial for the glass tube to have a lower CTE. Low CTE glasses tend to produce fewer stresses during hot forming, which leads to a more uniform product. Hence, in some embodiments, the CTE is limited to no more than $6.9*10^{-6}K^{-1}$ or no more than $5.9*10^{--6}K^{-1}$. The CTE may be measured according to DIN ISO 7991:1987.

In some embodiments, the glass of the glass tube has a refractive $n_d$ index between 1.45 and 1.55, such as a refractive index between 1.49 and 1.50 or between 1.52 and 1.53.

The density of the glass tube may be between 1.8 and 3.0 $g*cm^{-3}$, such as between 2.0 and 2.8 $g*cm^{-3}$ or between 2.2 and 2.6 $g*cm^{-3}$.

In some embodiments, the outer surface of the glass tube has a protective coating that protects the glass tube against scratches. The protective coating may be removable by thermal decomposition that takes place at high temperatures. The coating material may comprise a polysorbate, such as polysorbate 80.

In an aspect, the invention provides a set of glass tubes, wherein at least 90% of the tubes have an azimuthal wall thickness deviation of not more than 8.0%, at most 5.0%, at most 4.0% at most 3.0%, at most 2.5% or at most 2.0%. In an aspect, the invention provides a set of glass tubes, wherein at least 90% of the tubes have an average azimuthal wall thickness deviation of not more than 8.0%, at most 5.0%, at most 4.0% at most 3.0%, at most 2.5% or at most 2.0%. In an aspect, the invention provides a set of glass tubes, wherein at least 90% of the tubes have a maximum azimuthal wall thickness deviation of not more than 8.0%, at most 5.0%, at most 4.0% at most 3.0%, at most 2.5% or at most 2.0%. The set of glass tubes may comprise at least 100, or at least 1000 or at least 3000 glass tubes, such as at least 5000 glass tubes. In some embodiments, the set is a set of 100, 150, or 200 glass tubes.

In an aspect, the present invention provides a process for producing glass tubes, comprising the steps:
  applying a glass melt onto an outer surface of a rotating conical mandrel by guiding the melt from a feed tank through an outlet, wherein the melt forms a strand of molten glass that flows from the outlet onto the outer surface of the mandrel,
  forming a hollow glass melt body on the conical mandrel,
  drawing the hollow glass melt body from the conical mandrel in a predetermined direction toward a front end for forming a glass tube,
  the outer surface having a wetting zone where the glass strand first contacts the conical mandrel, wherein the wetting zone is at a vertical distance from the outlet, wherein vertical movement of the mandrel is monitored,
  reducing vertical movement of the mandrel,
  cooling the hollow glass melt body,
  cutting the cooled glass melt body into glass tubes of desired lengths.

Reducing variations of the vertical movement may include moving the mandrel in a vertical direction to counteract the movement. Monitoring the movement of the mandrel may include monitoring the wetting zone. Reducing movement of the mandrel may include reducing movement of the wetting zone. Movement of the mandrel may be achieved mechanically as known to the skilled person.

Additionally or alternatively, the wetting zone may be at a horizontal distance from the outlet. The horizontal position may vary during the process. The process may include the step of reducing variations of the horizontal position, optionally by moving the mandrel in a horizontal direction to counteract the variations. The horizontal movement may be essentially perpendicular to the tube drawing direction.

Figure 4:
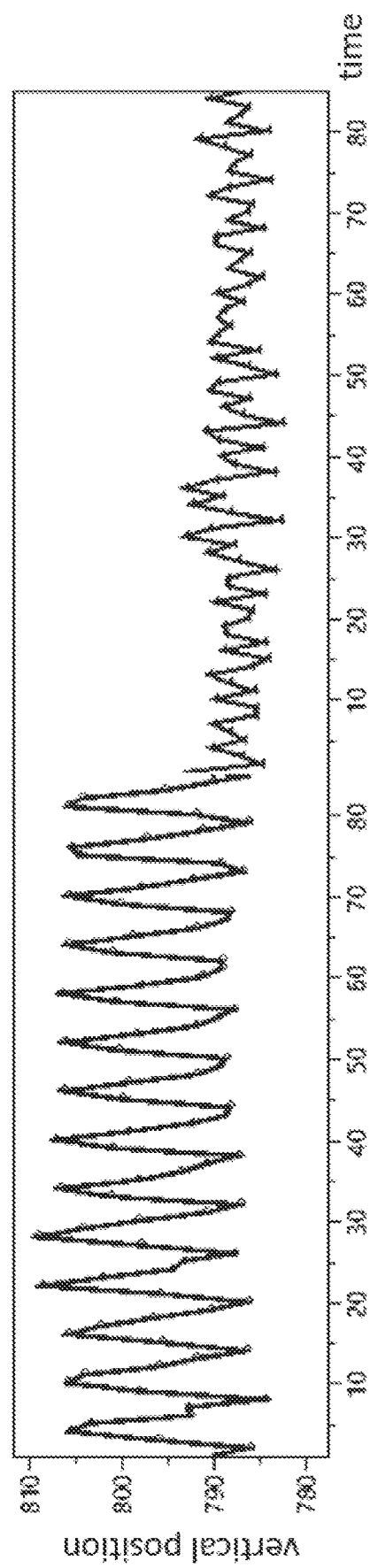
FIG. 4 illustrates variations of the vertical movement of a wetting zone on a surface of a mandrel.

The horizontal and/or vertical movement of the wetting zone may be monitored, for instance by one or more cameras and/or one or more lasers or other optical means. In some embodiments, the movement is monitored in a contactless way. For example, a movement of the mandrel may be recorded over a period of time. The recorded horizontal and/or vertical movement may subsequently be plotted and analyzed (e.g. as illustrated in FIG. 4).

The data may be used to control a device that is able to counteract a horizontal and/or vertical movement of the mandrel.

Thus, a spatial constancy of said mandrel relative to the outlet of the glass melt (i.e. the spout) can be achieved. This spatial constancy provides optimal conditions for achieving a highly uniform hollow glass melt body that results in a glass tube having minimal wall thickness deviations, such as at most 6.0%, along an azimuthal orientation. It is hypothesized that by keeping the position of the mandrel essentially constant, the speed and amount of the glass melt reaching the body is constant. Thereby, a very homogeneous distribution of the melt on the mandrel may be achieved.

The hollow glass melt body is drawn from the tubular body in a predetermined direction toward a front end. In some embodiments, compressed air is blown through the tubular body to prevent the hollow glass melt body from collapsing. At the front end of the mandrel, a so-called drawing bulb (in German: "Ziehzwiebel") is formed from which the glass tube is shaped by hot forming. Afterwards, the formed glass tube may be drawn over a line of support rollers by a drawing device.

In some embodiments, the rotational speed of the conical mandrel is between 5.0 to 20.0 rpm, from 9.0 to 12.0 rpm, or from 9.5 to 11.0 rpm.

The incline of the conical mandrel may be between 5° and 45°. In a further exemplary embodiment, the volume flow rate of the glass melt is between 0.4 to 0.55 m³/h. In some embodiments, the temperature of the glass strand at the wetting zone is between 750° C. to 1400° C. In some embodiments, the drawing speed of the hollow glass melt body is between 0.1 and 5 m/s, such as between 0.3 and 4.0 m/s.

In an exemplary embodiment, the wetting zone is not on the topmost point of the mandrel but on an ascending portion of the mandrel surface, i.e. the glass melt may hit the mandrel surface and rise to the top on the surface. In some embodiments, the wetting zone may be located essentially at the radially topmost point (0°) of the mandrel or on a descending portion of the mandrel surface. Optionally, the wetting zone may be located at an ascending position corresponding to −5° to −45°, or −10° to −35°. In some embodiments, the wetting zone is at a descending position corresponding to +5° to +45°, or +10° to +35°. In some embodiments, the wetting zone is at a position of −10° to +10°, or from −5° to +5°. It was found that a wetting zone in an ascending position improves WTD.

In some embodiments, the vertical distance between wetting zone and outlet is between 20 and 250 mm, such as from 50 to 200 mm.

In another aspect, the present invention provides a glass tube and/or a set of glass tubes obtainable by the process described herein.

In an aspect, the invention provides a use of a glass tube or a set of glass tubes for the production of pharmaceutical containers. In some embodiments, the containers are selected from the group consisting of ampoules, vials, syringes and/or cartridges.

Referring now to the drawings, FIG. 1 shows, in a schematic sectional view, a manufacturing apparatus for a method provided according to an embodiment of the present invention.

The manufacturing apparatus 1 in FIG. 1 shows a device for drawing a glass tube 2 by the Danner method. The apparatus 1 comprises a feed tank 3 that contains a glass melt 4. In the feed tank 3, the glass melt 4 typically has a temperature of above 1300° C. and is applied via an outlet 5 onto an outer surface of a rotating conical mandrel 6 that is called Danner pipe. The Danner pipe may rotate about an axis essentially parallel to the drawing direction.

As can be derived from FIG. 1, the conical mandrel 6 is obliquely downwardly inclined and driven by a power unit 7. The glass melt 4 flows from the outlet 5 on the outer surface of the conical mandrel 6 and forms thereon a hollow glass melt body 8. The position where the molten glass strand first touches the conical mandrel 6, while flowing from the outlet 5 towards the conical mandrel 6, is referred to as the wetting zone. The hollow glass melt body 8 is drawn from the conical mandrel 6 in a predetermined direction toward a front end. Additionally, compressed air is blown through the conical mandrel 6 to prevent the hollow glass melt body 8 from collapsing. At the front end of the conical mandrel 6 a so-called drawing bulb 9 (in German: "Ziehzwiebel") is formed from which the glass tube 2 is made by hot forming.

The formed glass tube 2 is drawn over a line of support rollers 10 by a drawing device 11 situated up to 120 m away from the conical mandrel 6, thereby passing a quality control unit 12 that monitors the glass tube 2 in regard to different quality parameters, for instance wall thickness, bubbles etc. At the end of the line, a cutting device 13 cuts the formed glass tube 2 into single glass tubes 14.

The position of the rotating mandrel 6 and/or the outlet 5 is continuously monitored and adjusted, if necessary, such that an oscillating movement of the mandrel 6 is compensated, such as by using a monitoring device 15, e.g. one or more cameras or lasers. Reduction or elimination of the vertical and/or horizontal movement of the mandrel may be accomplished by raising or lowering the mandrel and/or by moving the mandrel horizontally in order to counteract vertical and/or horizontal movement.

Figure 2:
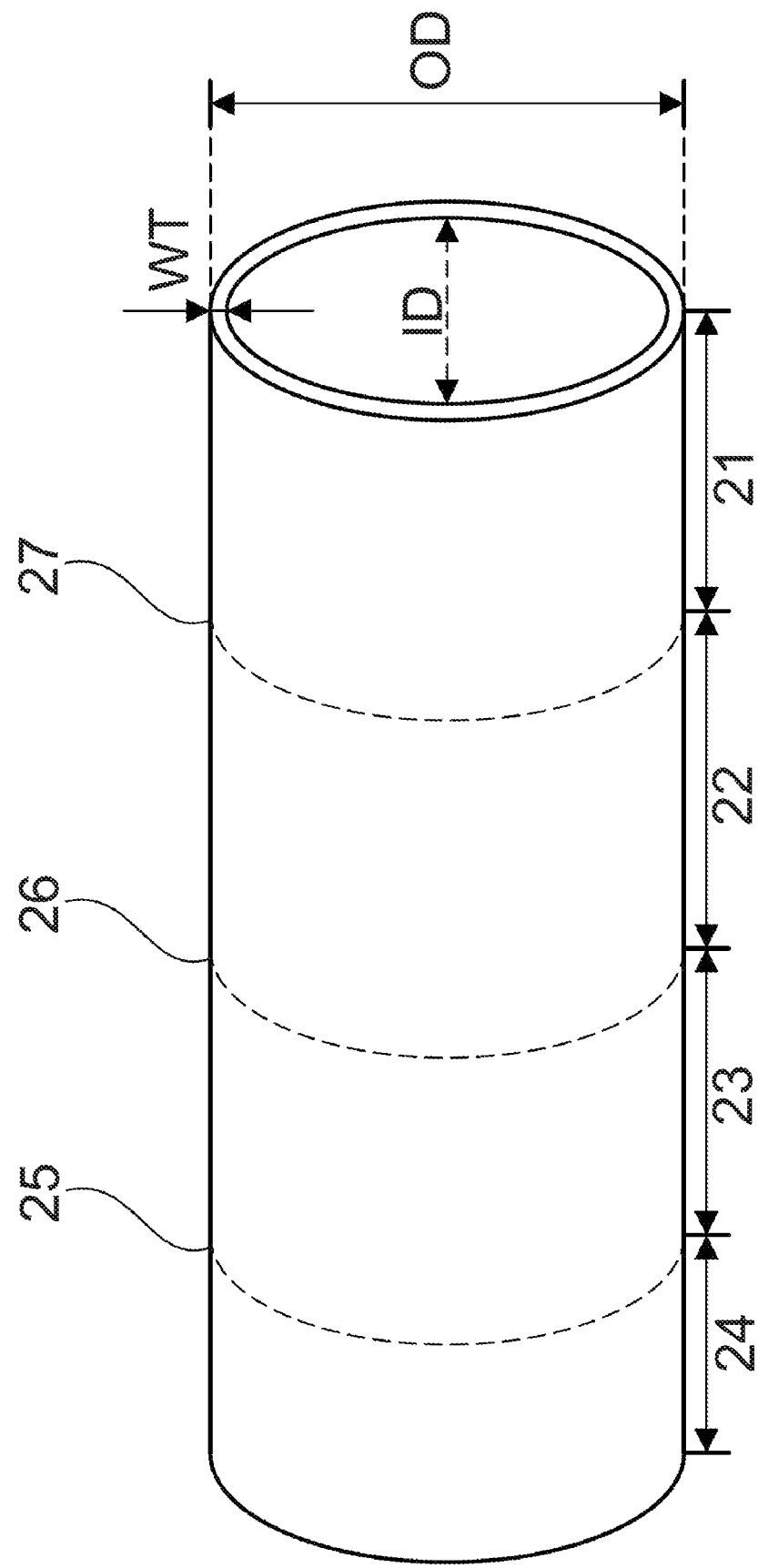
FIG. 2 illustrates an example of a glass tube having an outer diameter, an inner diameter, and a wall thickness.

FIG. 2 shows an example of a glass tube 14 having an outer diameter OD, an inner diameter ID and a wall thickness WT. The azimuthal wall thickness deviation can be measured at a first cross-section 25 in a first section of the glass tube, a second cross-section 26 in a second section of the glass tube 14 and a third cross-section 27 in a third section of the glass tube 14. The first cross-section 25 may be spaced apart a distance 24 from the first edge of the tube. The second cross-section 26 may be disposed at a distance 23 from the first cross-section 25. The third cross-section 27 may be disposed at a distance 22 from the second cross-section 26. The third cross-section 27 may be at a distance 21 from the second edge of the glass tube. The distances 21, 22, 23 and 24 may each be about one fourth of the tube length. Optionally, distances 22 and 23 are of about the same length.

Figure 3:
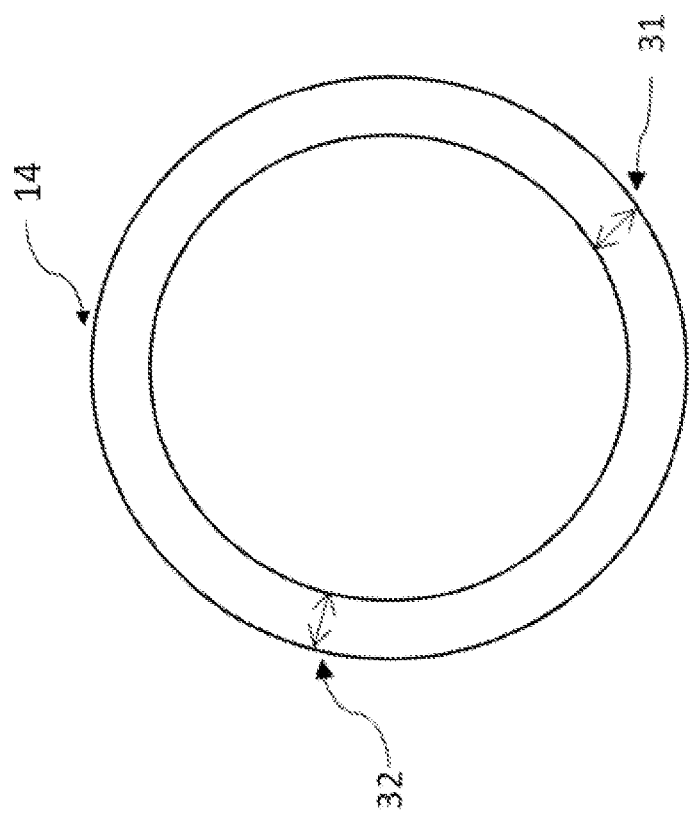
FIG. 3 illustrates a cross-section of a glass tube.

FIG. 3 shows a cross-section of a glass tube 14. For determination of the azimuthal wall thickness deviation, two wall thicknesses 31, 32, i.e. the lowest and the highest wall thickness within the cross-section are taken into account. The azimuthal wall thickness deviation can be calculated from the lowest and highest wall thickness values according to the following formula:

$$WTD = 100 - \left(\frac{\text{lowest wall thickness value}}{\text{highest wall thickness value}} * 100\right) \%.$$

FIG. 4 shows variations of the vertical movement of the wetting zone on the surface of the mandrel. The left part of the diagram shows that the vertical position varies by about 20 pixels, when no measures are taken to reduce variations of vertical position. The right part shows the variations measured when measures are applied that reduce vertical variations, i.e. the variations are reduced to about 10 pixels. A pixel may, for example, correspond to about 77 μm.

Figure 5:
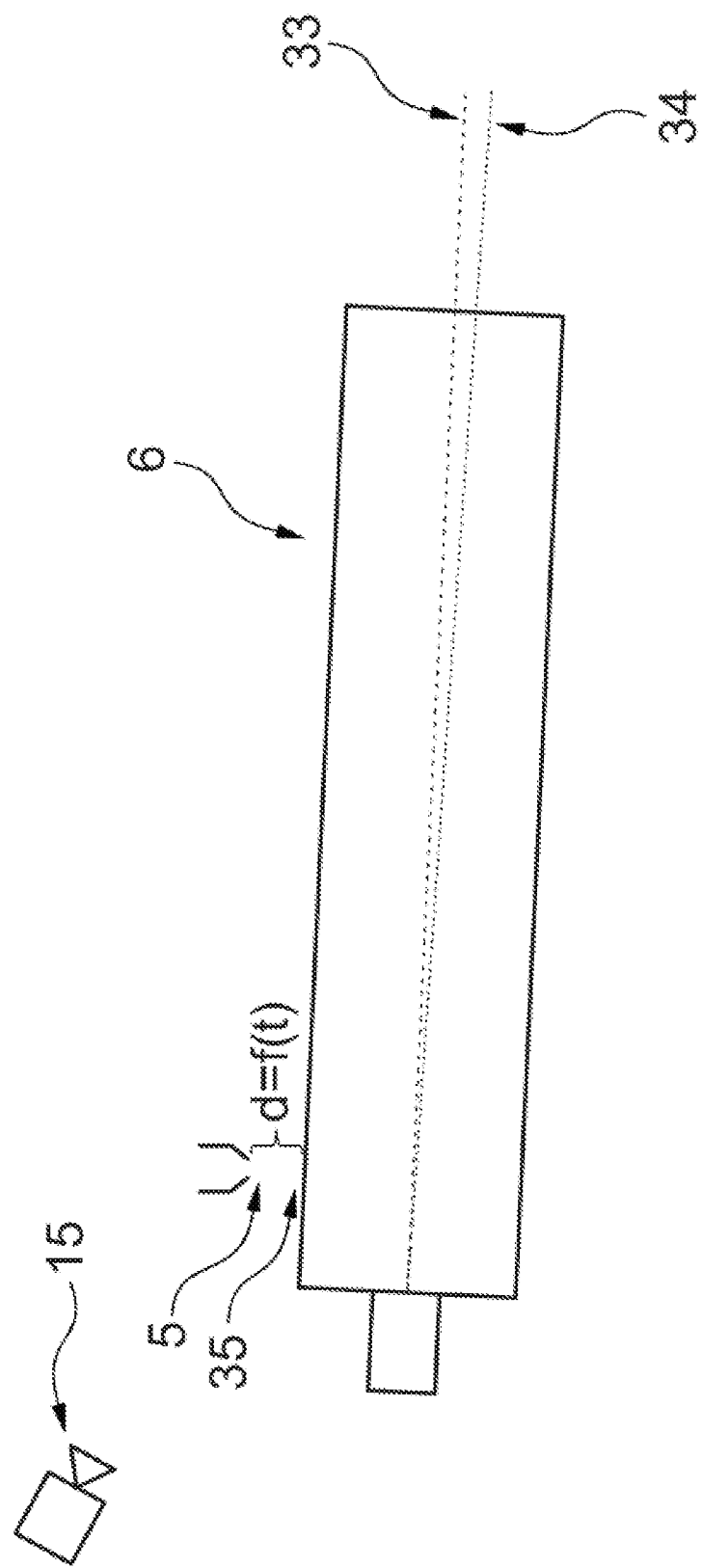
FIG. 5 is a schematic drawing of a mandrel having a mandrel axis.

FIG. 5 is a schematic drawing of a mandrel 6 having a mandrel axis 33. The mandrel 6 rotates about a rotation axis 34. The rotation axis 34 is not the same as the mandrel axis 33 which will cause variations in the position of the wetting zone 35. Further, FIG. 5 shows the distance d of the wetting zone from the outlet 5 from the wetting zone 35. The distance changes with time (d=f(t)). is the position of wetting zone 35 is monitored using monitoring unit 15, e.g. a camera.

Figure 6:
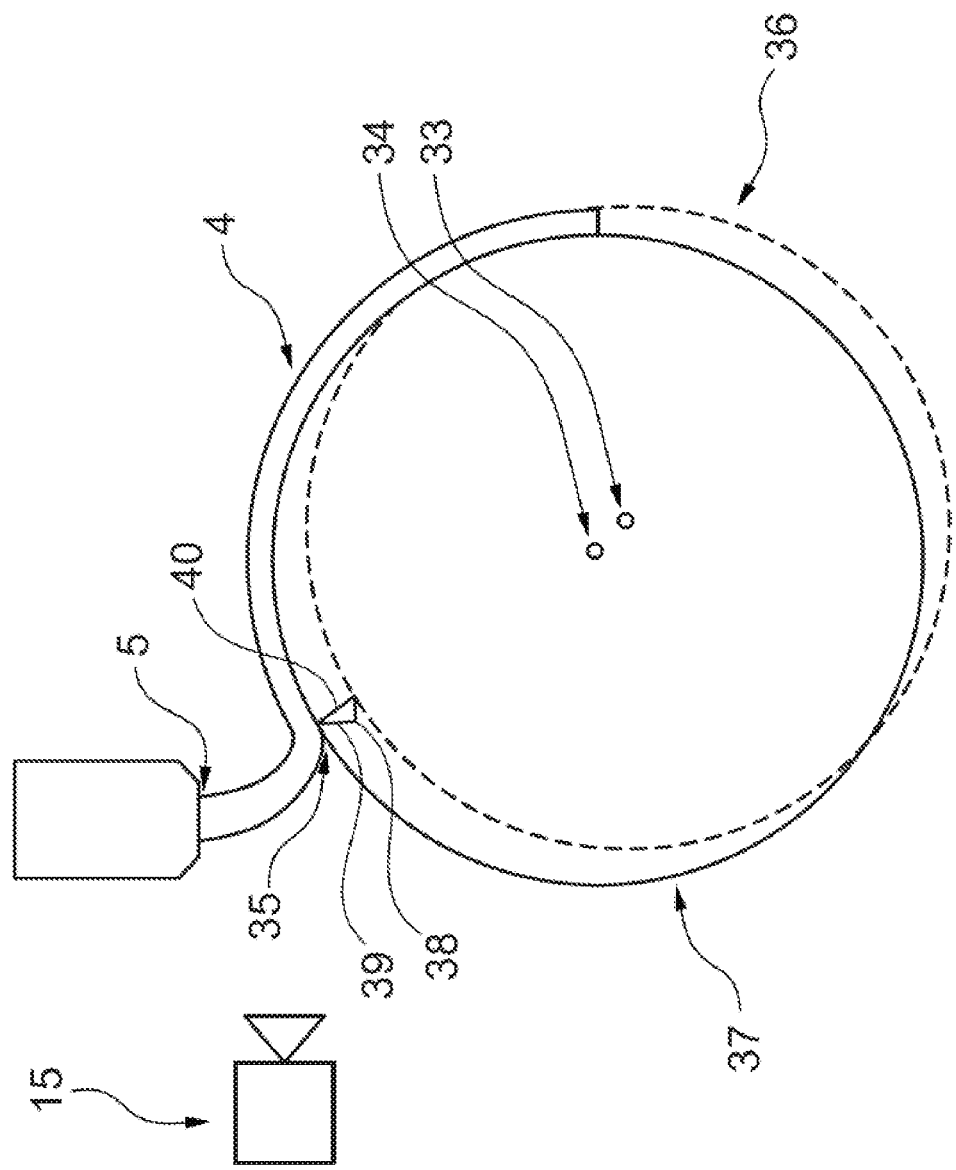
FIG. 6 is a schematic cross-sectional drawing of a mandrel having a mandrel axis and a rotational axis.

FIG. 6 is a schematic cross-sectional drawing of a mandrel having a mandrel axis 33 and a rotational axis 34. Further, FIG. 6 shows wetting zone 35 and outlet 5. Glass melt 4 flows from the outlet 5 to the wetting zone 35 and is distributed on the mandrel 6. The theoretical position 36 of the mandrel is indicated as a dashed line. The actual mandrel position 37 is shown as a solid line. The total displacement 40 of the mandrel position 37 relative to its theoretical position 36 is indicated. Total displacement 40 is composed of horizontal displacement 38 and vertical displacement 39. The position of wetting zone 35 is monitored by monitoring device 15. In this figure, the wetting zone 35 is not on the topmost point of the mandrel 6 but on an ascending portion of the mandrel surface, i.e. the glass melt hits the mandrel surface and rises to the top on the surface. In the figure, the position is between −5° and −45°. In some embodiments, the wetting zone 35 may be located at the topmost point of the mandrel or on a descending portion of the mandrel surface.

EXAMPLES

Example 1

Glass tubes 14 of 1.5 m length was prepared using the Danner method described in this disclosure. The glass processed in this manner had the following VFT constants: A=−1.41; B=5047.3; $T_0$=224.7° C.

Different tube diameters were produced in consecutive production runs. Three tubes were picked for WTD assessment. The azimuthal wall thickness deviation was determined at three cross-sections along the length of the glass tube 14. The first azimuthal wall thickness deviation value was determined by measuring the wall thickness deviation at a first cross-section 25 of the glass tube 14, the second value was determined by measuring the wall thickness deviation in the second cross-section 26 of the glass tube 14 and the third value was determined by measuring the wall thickness deviation in the third cross-section 27 of the glass tube 14. An azimuthal wall thickness deviation (WTD) was calculated for each cross-section. The maximum WTD is the highest WTD measured in each tube.

|  | Tube 1 | Tube 2 | Tube 3 |
| --- | --- | --- | --- |
| $1^{st}$ cross-section | | | |
| lowest wall thickness | 0.896 | 1.387 | 0.984 |
| highest wall thickness | 0.919 | 1.420 | 1.008 |
| WTD | 2.5% | 2.3% | 2.4% |
| $2^{nd}$ cross-section | | | |
| lowest wall thickness | 0.896 | 1.388 | 0.985 |
| highest wall thickness | 0.920 | 1.421 | 1.007 |
| WTD | 2.6% | 2.3% | 2.2% |
| $3^{rd}$ cross-section | | | |
| lowest wall thickness | 0.896 | 1.387 | 0.986 |
| highest wall thickness | 0.920 | 1.420 | 1.008 |
| WTD | 2.6% | 2.3% | 2.2% |
| maximum WTD | 2.6% | 2.3% | 2.4% |
| average WTD | 2.6% | 2.3% | 2.3% |

Example 2

A glass tube was produced by guiding a glass melt from a feed tank through an outlet and onto an outer surface of a rotating conical mandrel according to the Danner process. During production, the vertical movement of the mandrel in the area of the wetting zone was measured continuously. The vertical movement was reduced by adjusting the position of the mandrel. The adjustment was done by moving the suspension of the mandrel up and down to counteract the variations of vertical position. As a result, the amplitude of the variations was decreased and the azimuthal wall thickness deviation was improved (see FIG. 4). The amplitude of variations in vertical position was 20 pixels without compensation and 10 px with compensation. This reduction reduced the maximum WTD of glass tubes by 4%.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

REFERENCE NUMBERS 1 manufacturing plant
2 glass tube
3 reservoir
4 glass melt
5 outlet
6 conical mandrel
7 power unit
8 glass melt body
9 drawing bulb
10 support rollers
11 drawing device
12 quality control unit
13 cutting device
14 single glass tubes
15 monitoring device
21 distance between second edge and third cross-section
22 distance between second and third cross-sections
23 distance between first and second cross-sections
24 distance between first cross-section and first edge
25 first cross-section
26 second cross-section
27 third cross-section
31 first wall thickness
32 second wall thickness
33 mandrel axis
34 rotation axis
35 wetting zone
36 theoretical mandrel position
37 mandrel position
38 horizontal displacement
39 vertical displacement
40 total displacement

What is claimed is:

1. At least one glass tube having an azimuthal wall thickness deviation WTD of not more than 6.0%, the azimuthal wall thickness deviation being determined based on a lowest wall thickness value and a highest wall thickness value measured within a cross-section of the at least one glass tube, the azimuthal wall thickness deviation WTD being calculated according to the following formula:

$$WTD = 100 - \left(\frac{\text{lowest wall thickness value}}{\text{highest wall thickness value}} * 100\right) \%.$$

2. The at least one glass tube of claim 1, wherein the azimuthal wall thickness deviation WTD is at most 5.0%.

3. The at least one glass tube of claim 1, wherein the azimuthal wall thickness deviation WTD is at most 4.0%.

4. The at least one glass tube of claim 1, wherein the azimuthal wall thickness deviation WTD is at most 3.0%.

5. The at least one glass tube of claim 1, wherein the azimuthal wall thickness deviation WTD is at most 1.5%.

6. The at least one glass tube of claim 1, wherein the at least one glass tube does not exceed the azimuthal wall thickness deviation WTD of at most 6.0% at two or more cross-sections, wherein at least two of the cross-sections are spaced apart from each other by at least 0.5 m.

7. The at least one glass tube of claim 6, wherein at least two of the cross-sections are spaced apart from each other by at most 1.4 m.

8. The at least one glass tube of claim 1, wherein the at least one glass tube does not exceed the azimuthal wall thickness deviation WTD of at most 6.0% at a first cross-section and a second cross-section, wherein the first cross-section is positioned in a first section of the at least one glass tube and the second cross-section is positioned in a second section or a third section of the at least one glass tube.

9. The at least one glass tube of claim 1, wherein the azimuthal wall thickness deviation WTD does not exceed 6.0% at any cross-section over a whole length of the at least one glass tube.

10. The at least one glass tube of claim 1, wherein the at least one glass tube has at least one of the following:
   a length of at least one of at least 0.50 m, at least 1.00 m, or 1.5 m;
   an outer diameter between 6.0 mm and 55.0 mm; or
   a wall thickness between 0.3 mm and 3.5 mm.

11. The at least one glass tube of claim 1, wherein a glass of the at least one glass tube has the following Vogel-Fulcher-Tammann (VFT) constants:
   A ranging from −5.0 to 0.0;
   B ranging from 4000 to 12000; and
   $T_0$ ranging from 1° C. to 250° C.

12. The at least one glass tube of claim 1, wherein the at least one glass tube comprises a glass comprising the following components in weight percent (wt.-%):

| | |
|---|---|
| $SiO_2$ | 50-90 |
| $B_2O_3$ | 0-20 |
| $Al_2O_3$ | >0-18 |
| $Na_2O$ | 0-15 |
| $K_2O$ | 0-5 |
| $Li_2O$ | 0-2 |
| CaO | 0-15 |
| BaO | 0-6 |
| $ZrO_2$ | 0-5 |
| $TiO_2$ | 0-5 |
| $Fe_2O_3$ | 0-3 |

13. The at least one glass tube of claim 1, wherein the at least one glass tube has an average azimuthal wall thickness deviation WTD of at most 6.0%.

14. The at least one glass tube of claim 1, wherein the at least one glass tube has an average azimuthal wall thickness deviation WTD of at least 0.1%.

15. The at least one glass tube of claim 1, wherein the at least one glass tube has a maximum azimuthal wall thickness deviation WTD of at least 0.5%.

16. The at least one glass tube of claim 1, wherein the at least one glass tube comprises a plurality of glass tubes to form a set of glass tubes, at least 90% of the glass tubes having an azimuthal wall thickness deviation WTD of not more than 8.0%, the azimuthal wall thickness deviation WTD for each glass tube being determined based on a lowest wall thickness value and a highest wall thickness value measured within a cross-section of the glass tube, the azimuthal wall thickness deviation WTD being calculated according to the following formula:

$$WTD = 100 - \left(\frac{\text{lowest wall thickness value}}{\text{highest wall thickness value}} * 100\right) \%.$$

17. The set of glass tubes of claim 16, wherein the plurality of glass tubes comprises at least 100 glass tubes.

18. The set of glass tubes of claim 16, wherein at least 90% of the glass tubes have an average azimuthal wall thickness deviation WTD of not more than 8.0%.

19. The at least one glass tube of claim 1, wherein the at least one glass tube is produced by a Danner method.

* * * * *